UNITED STATES PATENT OFFICE 2,307,270

BUILDING MATERIAL

Willard W. Hodge, Pittsburgh, Pa., assignor to Mellon Institute of Industrial Research, a corporation of Pennsylvania, as trustee No Drawing. Application August 4, 1940,
Serial No. 351,442

7 Claims. (Cl. 106—89)

This invention relates to the preparation of cement for industrial use. It is the usual, indeed the universal, practice to grind gypsum with Portland cement, with the consequence and effect that the setting time is prolonged and the ultimate strength of the finished article increased. My invention lies in the discovery that, in place of gypsum, I may grind hydrated ferrous sulfate with cement and gain like effect as with gypsum; and that in so doing I may realize these additional advantages, (1) the creation of a new use for copperas, a substance which as a product of pickling is a burden upon the steel industry, and (2) by control of the water content of the added material, the effecting of nice adjustment, either of the time of setting, or of ultimate strength, or of both.

According to standard practice, the amount of gypsum that is ground with a given quantity of cement is such as to afford an $SO_3$ content of 1.50–2.00%. (In such recognition of an $SO_3$ content is involved the theoretical consideration that calcium sulfate, $CaSO_4$ may be regarded as an association of $CaO$ and $SO_3$.) In the practice of my invention I have found that the amount of ferrous sulfate may be determined by the same standard.

The invention may be enjoyed by following this exemplary procedure—

Cement clinker, as it comes from the conventional calcining kiln, is preliminary crushed to pass a 20-mesh sieve. Cement clinker will be understood to be the product formed when argillaceous material, such as certain kinds of clay, is thoroughly mixed, ground, and fired at high temperature together with the correct quantities of calcareous material, such as limestone. The product that comes from the cement kiln is usually in the form of small to medium sized hard pebbles, the material having been heated in the kiln to the point of incipient fusion. This product is known as cement clinker. To the crushed material the iron sulfate in dry and finely divided condition is added, and the combined substances are ground together and brought to a uniform mixture of such degree of fineness that 90% or more will pass through a 200-mesh screen. The material then is ready for use.

I have carried through an extended series of experiments, using in place of gypsum various specific ferrous sulfates and blends of sulfates, and give in the following tabulation the results.

TABLE A

*Summary of Group "A" experiments on the effects of and possible uses for iron sulfates in cements*

| Specimens | Materials | Chemical tests | | | Physical tests | | | |
|---|---|---|---|---|---|---|---|---|
| | | Per cent iron sulfate added | Per cent loss on ignition | Per cent $SO_3$ | Fineness-200-mesh (Per cent passing) | Water/cement ratio (plastic mortar) | Setting time in minutes | |
| | | | | | | | Initial | Final |
| A-I | Portland cement, a good commercial brand carrying gypsum. | | 1.76 | 1.70 | 94.0 | 57/100 | 180 | 360 |
| | Portland cement clinker crushed to pass a 20-mesh sieve and ground with iron sulphates as indicated: | | | | | | | |
| A-II | $FeSO_4.7H_2O$, (copperas) | 5.0 | 1.90 | 1.68 | 93.0 | 57/100 | 290 | 590 |
| A-III | $FeSO_4.5H_2O$ | 4.2 | 1.90 | 1.72 | 96.5 | 65/100 | 60 | 181 |
| A-IV | $FeSO_4.1\tfrac{1}{2}H_2O$ (powder) | 3.0 | .58 | 1.54 | 94.0 | 65/100 | 5 | 10 |
| A-V | $FeSO_4.3H_2O \{^{7H_2O}_{1\tfrac{1}{2}H_2O}\}$ | 3.7 | 1.00 | 1.63 | 96.5 | 65/100 | 5 | 20 |
| A-VI | $FeSO_4.1\tfrac{1}{2}H_2O$, (lumpy) | 3.0 | .50 | 1.55 | 92.0 | 65/100 | 45 | 80 |
| A-VII | $FeSO_4.7H_2O$ (copperas) | 4.2 | 1.70 | 1.46 | 93.2 | 57/100 | 280 | 485 |
| A-VIII | $FeSO_4.7H_2O$ (copperas) | 3.4 | 1.36 | 1.28 | 95.0 | 57/100 | 203 | 309 |
| A-IX | $FeSO_4.3H_2O \{^{5H_2O}_{1\tfrac{1}{2}H_2O}\}$ | 3.7 | .98 | 1.72 | 94.5 | 65/100 | 20 | 60 |
| A-X | $Fe_2(SO_4)_3$, hydrated | 3.0 | 1.03 | 1.81 | 92.0 | 67/100 | Flash | Set |
| A-XI | Portland cement clinker | | .45 | .45 | 96.0 | 68/100 | 45 | 420 |

Upon the tabulated results I make the following comments.

Specimen A-XI was ground Portland cement clinker alone, with no modifying addition. The initial setting time was 45 minutes, and the final setting time was 420 minutes.

Specimen A-I is the article of present-day standard practice. The addition is an addition of gypsum; and, in consequence, the setting times are prolonged to, initial, 180 minutes; final, 360 minutes.

Specimen A–X is presented for purposes of comparison. In it the addition material is not the material of my invention ferrous sulfate, but ferric sulfate; and it will be seen that instead of gaining the desired end of delay in setting-time, the specimen manifested a flash set—a loss, not a gain, in utility.

Specimens A–II to A–IX serve to illustrate the invention. Ferrous sulfate in a variety of specific forms and mixtures and in quantities that accorded with standard practice were ground with crushed clinker; and from the results it appeared that ferrous sulfate pentahydrate ($FeSO_4.5H_2O$) and ferrous sulfate heptahydrate, commonly known as copperas ($FeSO_4.7H_2O$) were effective to prolong the time of initial set beyond that obtained with gypsum; and that by the blending of specific sulfates the time of setting and ultimate strength could be varied.

It should be remarked that in this series of experiments monohydrate ferrous sulfates ($FeSO_4+1\frac{1}{2}H_2O$, approximately) derived from two sources and in two conditions were used. That of specimen A–VI is distinguished as lumpy. The monohydrate of specimens A–IV and A–IX was from another source and was in the condition of powder.

The results of tests of strength and of color upon the same eleven specimens is given in the following table.

been noted. Copperas and associated hydrated ferrous sulfates are a drug on the market. They are waste material, and the disposal of them is embarrassed by laws that forbid the pollution of surface waters. The specific sulfates of different degrees of hydration may by known procedure be segregated. Those of higher water content (water of crystallization) may by heating be changed to species of lower water content. All of these matters are known and he who follows the teaching of this specification has this knowledge available to him. Hydrated ferrous sulfates generally are available, including the species of the foregoing tabulation.

It is common to neutralize spent pickling solution more or less completely with lime. The precipitate may be used to prolong the setting time and to increase the ultimate strength of cement.

I claim as my invention:

1. Building material consisting of a finely divided mixture of cement clinker and a 3 to 5% addition of hydrated ferrous sulphate.

2. Building material consisting of a finely divided mixture of Portland cement clinker and a 3 to 5% addition of ferrous sulphate heptahydrate.

3. Building material consisting of a finely divided mixture of Portland cement clinker and a substantially 4.2% addition of ferrous sulphate pentahydrate.

4. Building material consisting of a finely divided mixture of Portland cement clinker and a blend of ferrous sulphate heptahydrate with

TABLE AA

*Summary of Group "A" experiments on the effects of and possible uses for iron sulfates in cements*

| Series | Engineering tests | | | | | | | | Observations and remarks |
|---|---|---|---|---|---|---|---|---|---|
| | Tensile strength, pounds per square inch, average of 6 specimens | | | | Compressive strength, pounds per square inch, average of 3 specimens | | | | Notes on color, set and workability |
| | 3 days | 7 days | 28 days | 6 months | 3 days | 7 days | 28 days | 6 months | |
| A–I | 284 | 310 | 466 | 422 | 1,204 | 2,265 | 4,125 | 4,008 | Light grey color. |
| A–II | 183 | 330 | 413 | 420 | 908 | 2,275 | 4,025 | 4,618 | Mud brown powder—(light cream mortar, dry). |
| A–III | 205 | 340 | 378 | 360 | 708 | 1,695 | 3,200 | 3,570 | Mud brown powder—(light cream mortar, dry). |
| A–IV | 209 | 288 | 382 | 304 | 695 | 1,529 | 2,500 | 2,383 | Grey color, flash set. |
| A–V | 191 | 296 | 372 | 401 | 500 | 1,820 | 2,683 | 2,879 | Light brown powder flash set—bleaches grey, dry in mortar. |
| A–VI | 278 | 285 | 425 | 430 | 200 | 1,442 | 2,575 | 3,841 | Grey color. |
| A–VII | 252 | 305 | 380 | 407 | 766 | 1,850 | 3,675 | 4,362 | Mud brown powder—(light cream mortar, dry). |
| A–VIII | 206 | 290 | 397 | 323 | 708 | 1,283 | 2,766 | 3,130 | Mud brown powder—(light cream mortar, dry). |
| A–IX | 173 | 207 | 329 | 292 | 766 | 1,266 | 2,215 | 2,377 | Grey color. |
| A–X | 165 | 252 | 357 | 361 | 100 | 590 | 2,088 | 2,815 | Grey color, flash set, specimens in molds were soft after 24 hrs. in moist cabinet. |
| A–XI | 206 | 293 | 339 | 348 | 583 | 1,066 | 2,450 | 2,204 | Grey color, sandy texture, poor workability. |

It will be perceived that specimens A–II, A–VI, and A–VII are of substantially equal excellence with that compounded with gypsum (A–I). And from these experiments it follows that copperas may be used with equally good effect as gypsum; that the ferrous sulfate pentahydrate, though less effective than gypsum, still has effect in prolonging setting time and increasing strength; that the monohydrate, though without apparent effect in prolonging setting time, has effect comparable with gypsum in increasing strength; and that the time of setting, which in the case of copperas alone is greatly prolonged, may be reduced by combining with a sulfate of relatively high water content another sulfate of lower water content.

The economical aspect of the invention has another hydrated ferrous sulphate of a lower degree of hydration.

5. The method herein described of controlling the setting time and strength of cement which consists in grinding with Portland cement clinker a controlled quantity of hydrated ferrous sulphate.

6. The method herein described of controlling the setting time and strength of cement which consists in grinding with Portland cement clinker a controlled quantity of hydrated ferrous sulphate within the range of 3 to 5%.

7. Building material consisting of a finely divided mixture of Portland cement clinker and such an amount of hydrated ferrous sulphate as to afford in the mix an $SO_3$ content of 1.50–2.00%.

WILLARD W. HODGE.